United States Patent [19]

Flambard et al.

[11] 3,798,961
[45] Mar. 26, 1974

[54] APPARATUS FOR NON-DESTRUCTIVE CHECKING OF WORKPIECES

[76] Inventors: Christian Flambard, 21, Avenue du Val d'Aunette, 60 Senlis; Alain Lambert, Residence Charles Pranard 94, rue Robert Schumann, Creil; Michel Pacreau, App. 8-ILM Bonsecours No 2, 60 Senlis, all of France

[22] Filed: Feb. 17, 1972

[21] Appl. No.: 226,771

[30] Foreign Application Priority Data
Feb. 25, 1971 France .......................... 71.06401

[52] U.S. Cl. ........................ 73/71.50, 73/67.8 S
[51] Int. Cl. ........................................... G01n 29/04
[58] Field of Search ..................... 73/71.50, 67.8 S

[56] References Cited
UNITED STATES PATENTS

| | | | |
|---|---|---|---|
| 2,532,507 | 12/1950 | Meunier | 73/71.5 X |
| 3,616,684 | 11/1971 | Nusbickel | 73/71.5 |
| 3,190,112 | 6/1965 | Beajard et al. | 73/71.5 |
| 3,472,064 | 10/1969 | Kortenhoven | 73/67.8 S |
| 3,242,723 | 3/1966 | Evans | 73/71.5 |
| 3,350,925 | 11/1967 | Coy | 73/71.5 |
| 2,836,059 | 5/1958 | Beaujard et al. | 73/67.8 S |

*Primary Examiner*—Donald O. Woodiel
*Assistant Examiner*—Arthur E. Korkosz
*Attorney, Agent, or Firm*—Holman & Stern

[57] ABSTRACT

An apparatus for non-destructive checking of workpieces using an ultrasonic probe in which a casing has a bore, and is closed at one end by a flexible diaphragm and at the other end by the probe. The casing is filled with liquid and bearing elements are provided for supporting the casing immovably on a workpiece such that the flexible membrane bears against the workpiece and provides an improved physical connection which in turn provides a connection between the probe and the workpiece under the best possible conditions. The checking apparatus can be supported by a bracket mounted on a base for supporting the workpiece, with the bracket being adjustable in height above the base and the checking apparatus being movable relative to the bracket.

6 Claims, 6 Drawing Figures

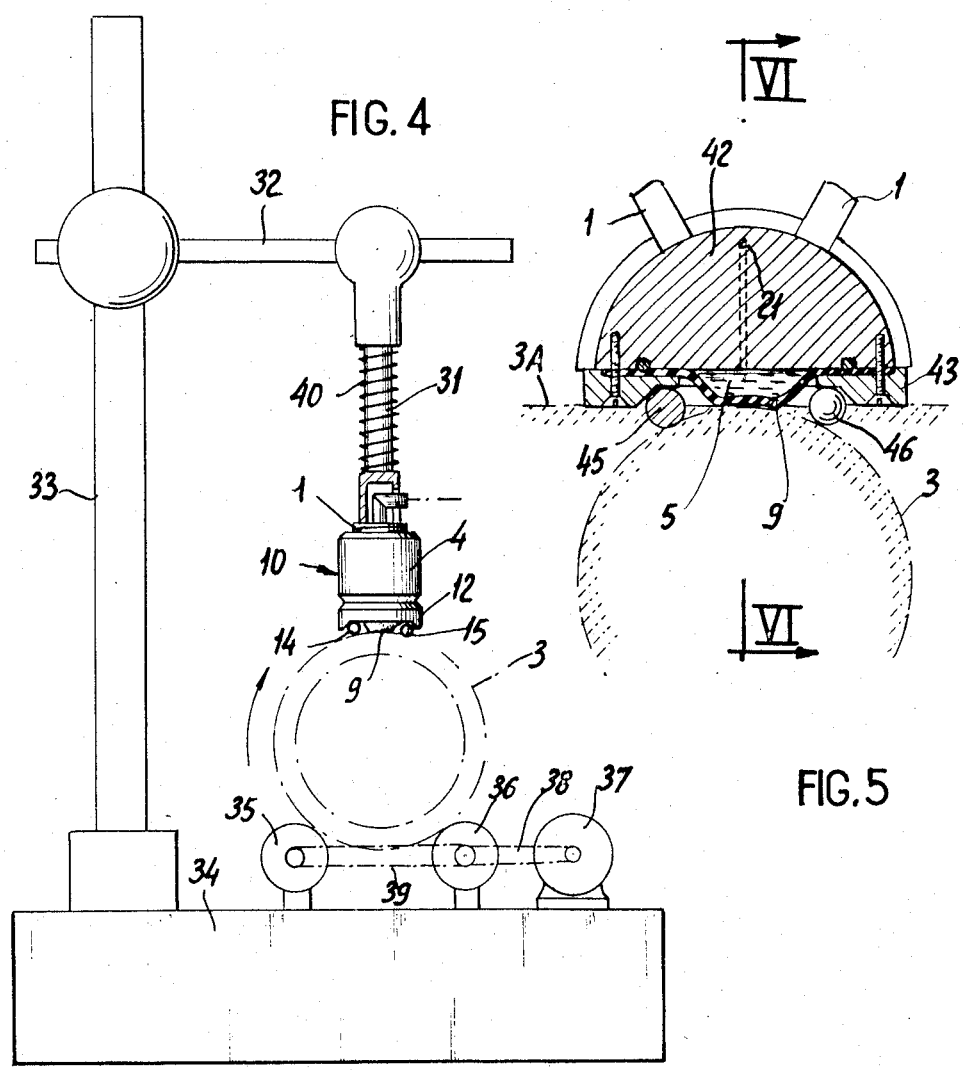
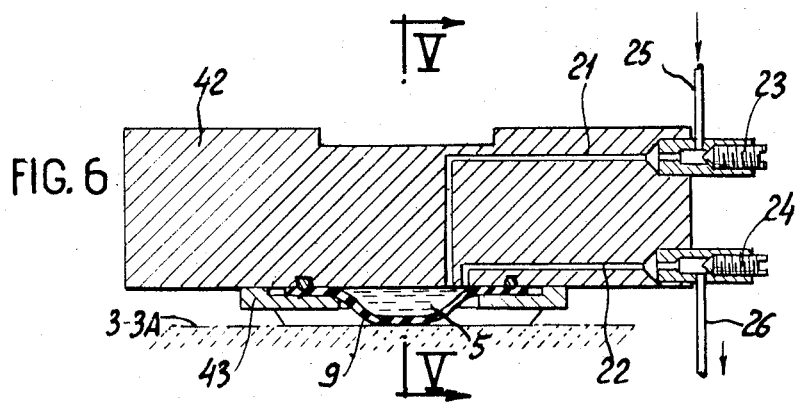

3,798,961

APPARATUS FOR NON-DESTRUCTIVE CHECKING OF WORKPIECES

BACKGROUND OF THE INVENTION

The invention relates to apparatus for non-destructive checking of workpieces using a probe which transmits and receives ultrasonic sounds or a transmitter-receiver ultrasonic probe.

PRIOR ART

The ultrasonic technique currently in use for the checking of defects and probing of workpieces consists of studying the phenomena of propagation and reflecting of vibratory waves created by piezo-electric, magneto-strictional or magneto-electric probes.

The most delicate problem which arises is how to communicate best the ultrasonic vibrations produced by the probe to the material being tested or else how to pick up these vibrations.

In certain of the types of apparatus being used, the probe is mounted in a casing containing liquid and having an annular base sealed by a membrane. Difficulties arise when attempts are made to place the annular base of the casing accurately against the workpiece to be tested, with the result that the acoustic link between the ultrasonic probe and the workpiece is not always perfect and the more so since the surface of the workpiece with which the casing comes into contact may be of any shape whatever.

Sometimes one simply applies a coating of oil to the active face of the probe and/or that of the part of the surface of the workpieces to be tested, but one then encounters difficulties both in placing one face against the other and keeping the linkage characteristics constant.

In other cases, the linkage material between the probe and the workpiece comprises a column of liquid under a given pressure, but this method is not really practical.

In yet other types of apparatus such as, for example, those which are described in our copending U.K. application No. 18526/71 entitled "A device for non-destructive measurement of a surface layer of a material," an intermediate block of material is interposed between the probe and the sample to be checked, with the result that the same problems arise in obtaining a good connection between this block and the workpiece.

SUMMARY OF THE INVENTION

The invention relates more especially to apparatus of the type in which the link is made, against the workpiece, through the intermediary of a hollow body supplied with liquid and a central bore in the body is closed by a flexible membrane. It aims at at improvement in these types of apparatus capable of measuring a perfect link regardless of the configuration of the part of the workpiece against which the connection has to be made, all this by using simple and handy means for putting it into practice.

According to the present invention, there is provided apparatus for checking workpieces with extremely high accuracy including a body provided with two ends, means defining a bore between said two ends of the body, means for connecting one end of said body to an ultrasonic probe, a flexible membrane closing the other end of said body, means for supplying fluid to fill up said body with fluid at least during the checking operation, and rigid elementary positioning means located directly on said other end of said body will very accurately define a theoretical geometrical surface mating with the surface of the portion of the workpiece to be checked, said elementary positioning means being designed for direct engagement of said elementary positioning means and said flexible membrane against said workpiece surface.

BRIEF DESCRIPTION OF THE DRAWINGS

Embodiments of the present invention will now be described by way of example with reference to the accompanying drawings, in which:

FIG. 4 is an elevation of a variation of the apparatus of FIGS. 1 to 3;

FIG. 5 is a view in a vertical section on the line V—V of FIG. 6, the view looking in the direction of the arrows and showing the lower part of a checking unit of a second embodiment; and FIG. 6 is a view taken along the line VI—VI of FIG. 5, the view looking in the direction of the arrows.

DESCRIPTION OF PREFERRED EMBODIMENTS

Figure 1:
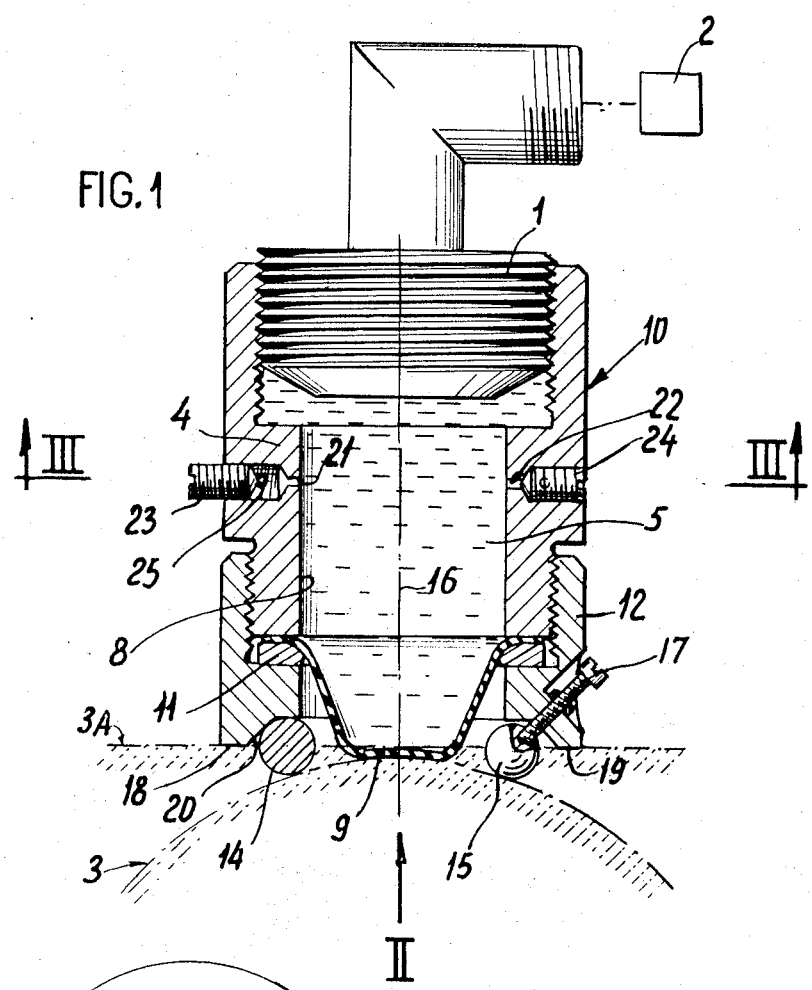
FIG. 1 is a view taken along the line I—I of FIG. 2, the view looking in the direction of the arrows of a first embodiment.
Figure 2:
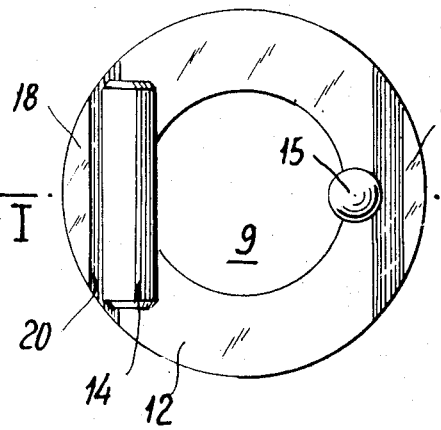
FIG. 2 is a diagrammatic view from below, viewed in the direction of the arrow II of FIG. 1.
Figure 3:
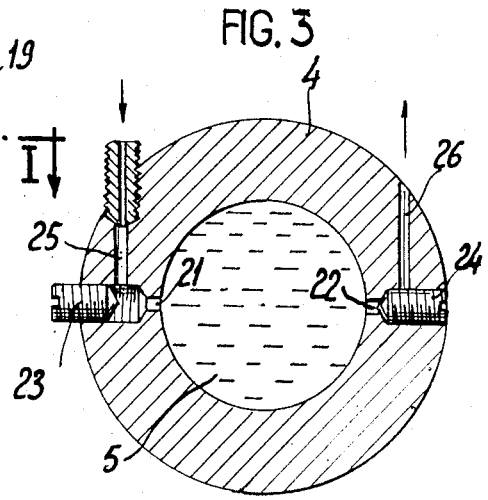
FIG. 3 is a view taken along the line III—III of FIG. 1, the view looking in the direction of the arrows.

The apparatus shown in FIGS. 1 to 3 is intended for the non-destructive checking of workpieces by means of an ultrasonic probe 1 intended to be connected to an appropriate measuring or analytical instrument 2, such as, for example, an electrical impulse generator and a cathode tube.

The connection between the probe 1 and a workpiece 3 is effected through a hollow body supplied with fluid 5. In this embodiment, the hollow body is formed from a casing 4 of generally cylindrical form in the upper part of which the probe 1 is fixed, for example by screws. The lower part of the casing 4 is provided with a bore 8 and is closed at its lower end by a flexible membrane 9, the periphery of which is applied to and tightened against an outer face of the lower end of the casing by means of a collar 11 held by a grooved ring 12.

The casing 4 is equipped with means for supporting it in a immovable manner on the workpiece 3, said means being designed and shaped to allow the casing 4 to rest on the workpiece by means of supporting elements 14, 15 which are unitary with a lower part of ring 12 (as viewed in FIG. 1) and which are designed and shaped to bear in an accurate and stable manner against the workpiece 3. The supporting elements 14 and 15 are diametrically opposed in relation to a central axis of the bore 8 of the casing 4 and, in this example where the external face of the workpiece is a cylindrical surface, the bearing element 14 is formed as a small cylinder the axis of which is orthogonal to an acoustic axis 16 of the probe 1 which passes substantially through the middle of the bore 8 of the casing 4. The other bearing element 15 is formed from a sphere located at the free end of a screw 17 which mounted in the lower part of the ring 12 in such a way that, by turning this screw 17 in either direction, it is possible to regulate precisely the orientation of the plane of the geometrical tangent externally of the two bearing elements 14, 15 so that it can be perfectly perpendicular to the acoustic axis 16 of the apparatus and, as a result, that this axis 16 is perpendicular to the surface of the workpiece 3 being tested.

The dimensions and general arrangement of the apparatus are such that the flexible membrane 9 can rest against the workpiece 3.

The ring 12 has two parallel ribs 18, 19 on its outer end face, with the ribs 18, 19 being diametrically opposed, the support cylinder 14 being supported upon an angled face 20 of the rib 18, and the screw 17 extending through the other rib 19 to support the sphere 15.

The casing 4 is provided with a filling aperture 21 and a draining aperture 22 each fitted with closing means in the form of a respective needle screw 23, 24. The inlet aperture 21 connects with a feed line 25 arranged to be connected to a source of appropriate fluid, and the draining aperture 22 is connected to a line 26 for removal of any air or excess liquid.

The operation of the apparatus is as follows:

With the probe 1 appropriately connected to the instrument 2, the casing 4 is brought to rest on the part of the surface of the workpiece 3 to be tested by means of the bearing elements 14 and 15. The internal volume of the casing 4 is brought into communication with the source of fluid through the lines 21 and 25 while the draining aperture 22 is open. When the whole internal volume of the hollow body defined between the probe 1 and the membrane 9 is full of fluid, that is, when a little liquid begins to escape through the draining outlet 26, the screw 24 is closed and fluid is allowed to continue flowing through aperture 25 until the flexible membrane 9 bears perfectly against the surface of the workpiece 3 such that the connection between the probe and the workpiece is effected under the best possible conditions.

The casing is positioned in a stable manner upon the workpiece and the membrane 9, which is very flexible, cannot in any way disturb this positioning. Moreover, the configuration of the surface of the workpiece cannot have any effect either upon the relative position of the probe and the workpiece.

It is possible to check workpieces of any shape whatever, it only being necessary to use bearing elements having a suitable configuration. To check workpieces with a plane surface 3A (FIG. 1) it is possible to bring the apparatus to bear upon the workpiece directly by means of the two ribs 18, 19.

In FIG. 4 is shown a variation which includes the apparatus of FIG. 1, indicated by reference number 10, but, in this variation, the apparatus 10 is supported in such a way as to be able to slide on a vertical rod 31 supported by a bracket 32 vertically adjustable on a vertical rod 33 whose lower end is fixed to a base or pedestal 34. The workpiece 3 is, in this case, in the form of a tube which rests on two horizontal pulleys 35, 36 which can be set into rotation by, for example, linking them to a reduction unit motor 37 through a suitable transmission gear shown schematically here in the form of a belt transmission 38, 39.

The use of this apparatus is the same as that of the apparatus in FIG. 1 but it is made easier by the fact that this apparatus 10 is held in place on the rod 31 on which it can slide vertically, in such a way that one can easily raise it a little to change the workpiece 3 but, notwithstanding, the connection between the probe and the workpiece is still effected perfectly since on each occasion the apparatus rests, by its two bearing elements 14 and 15 directly upon the surface of the workpiece. In the example shown, the casing 10 is biased downwards against the workpiece by a spring 40 which ensures the appropriate pressure for the bearing elements against the workpiece.

It would also be possible, by way of variation, to support the casing 10 rigidly in relation to the workpiece support base 34, that is, not to use direct bearing elements such as the elements 14 and 15.

FIGS. 5 and 6 show a second embodiment applicable to the apparatus in our aforementioned copending application and intended as an improvement in non-destructive devices for measuring the thickness of the layer involved in a modification of the superficial structure of a material.

In this embodiment the probe 1 is slidable on an external semi-cylindrical surface of a block 42 and the connection between this body and the workpiece 3 is formed by means of a liquid 5 contained in a hollow body formed between the lower flat surface of the semi-cylindrical block 42 and a base 43, a central bore of which is closed by a flexible membrane 9. The feed lines 21, 25 and the draining outlet lines 22 and 26 have been designating using the same reference numbers as FIG. 3.

In FIG. 5 are shown also two bearing elements 45, 46 of cylindrical shape interposed between the base 43 and the cylindrical surface of the workpiece in order to ensure a very accurate stable positioning of the block 42 in relation to the workpiece 3.

The operation is still the same, that is, the flexible membrane 9 fits perfectly against the portion of the surface of the test-piece and ensures perfect acoustic connection.

The same device can be used for checking workpieces whose surface might have an entirely different configuration, for example a plane surface such as shown in 3A. For this purpose, the base 43 would then be made to rest directly against the plane surface of the workpiece.

I claim:

1. An apparatus for checking workpieces including a body provided with two ends, means defining a bore between said two ends of the body, means for connecting one end of said body to an ultrasonic probe, a flexible membrane closing th other end of said body, means for supplying fluid to fill up said body with fluid at least during the checking operation, and rigid elementary positioning means located directly on said other end of said body for very accurately defining a theoretical geometrical surface mating with the surface of the portion of the workpiece to be checked, said elementary positioning means being designed for direct engagement of said elementary positioning means and said flexible membrane against said workpiece surface, the body having a central axis, and said elementary positioning means being constituted by two bearing elements provided and arranged on the body on opposed sides of said central axis, one of said elements being a cylindrical member and the other element being a spherical member.

2. The apparatus according to claim 1, wherein said other element is adjustable in position on the body.

3. An apparatus for checking workpieces with extremely high accuracy including a body provided with two ends, means defining a bore between said two ends of the body, means for connecting one end of said body to an ultrasonic probe, a flexible membrane closing the other end of said body, means for supplying fluid to fill up said body with fluid at least during the checking operation, and rigid elementary positioning means located directly on said other end of said body for very accurately defining a theoretical geometrical surface mating with the surface of the portion of the workpiece to be checked, said elementary positioning means being designed for direct engagement of said elementary positioning means and said flexible membrane against said workpiece surface.

4. The apparatus as claimed in claim 3, in which said rigid elementary positioning means are constituted by protrusions provided on said other end of said body.

5. The apparatus as claimed in claim 4, in which said protrusions are coplanar ribs.

6. The apparatus as claimed in claim 1, in which said other end of said body is provided with a rectilinear groove on one side of said body axis, with said cylindrical member being engaged against the walls of said groove.

* * * * *

UNITED STATES PATENT OFFICE
CERTIFICATE OF CORRECTION

Patent No. 3798961            Dated March 26, 1974

Inventor(s) Christian Flambard

It is certified that error appears in the above-identified patent and that said Letters Patent are hereby corrected as shown below:

[22] Filed:

February 16, 1972

Signed and sealed this 17th day of September 1974.

(SEAL)
Attest:

McCOY M. GIBSON JR.            C. MARSHALL DANN
Attesting Officer              Commissioner of Patents